United States Patent [19]

August, Jr. et al.

[11] Patent Number: 5,418,809
[45] Date of Patent: May 23, 1995

[54] MODULAR SLAB ASSEMBLY FOR A FACE-PUMPED LASER

[75] Inventors: John L. August, Jr., Schenectady; Mark J. Kukla, Ballston Spa; Joseph P. Chernoch, Scotia, all of N.Y.

[73] Assignee: General Electric Company, Schenectady, N.Y.

[21] Appl. No.: 251,143

[22] Filed: May 31, 1994

[51] Int. Cl.⁶ ............................................. H01S 3/091
[52] U.S. Cl. ..................................... 372/71; 372/92; 372/69; 372/65; 372/103
[58] Field of Search ................. 372/92, 65, 69, 71, 372/66, 70, 107, 98, 103

[56] References Cited

U.S. PATENT DOCUMENTS

| | | |
|---|---|---|
| 4,378,601 | 3/1983 | Eggleston, III et al. ............ 372/70 |
| 4,972,426 | 11/1990 | Steffen ................................ 372/66 |
| 5,251,369 | 10/1993 | August, Jr. et al. | |
| 5,278,860 | 1/1994 | August, Jr. et al. .............. 372/107 |

Primary Examiner—Leon Scott, Jr.
Attorney, Agent, or Firm—Paul R. Webb, II

[57] ABSTRACT

A modular slab assembly for a face-pumped laser includes a slab module having top and bottom reflector segments, with first and second inner end caps joined thereto. A plurality of alignment keys are disposed between the inner end caps and the reflector segments for maintaining alignment therebetween, with the inner end caps being removably fastened to the reflector segments. The inner end caps have central apertures for supporting a slab tube, with a laser slab being disposed through the tube and supported at its ends by outer end caps removably fixedly joined to respective ones of the inner end caps. A pair of removable lamp modules are disposed on opposite sides of the slab module and contain lamps for exciting the laser slab.

10 Claims, 5 Drawing Sheets

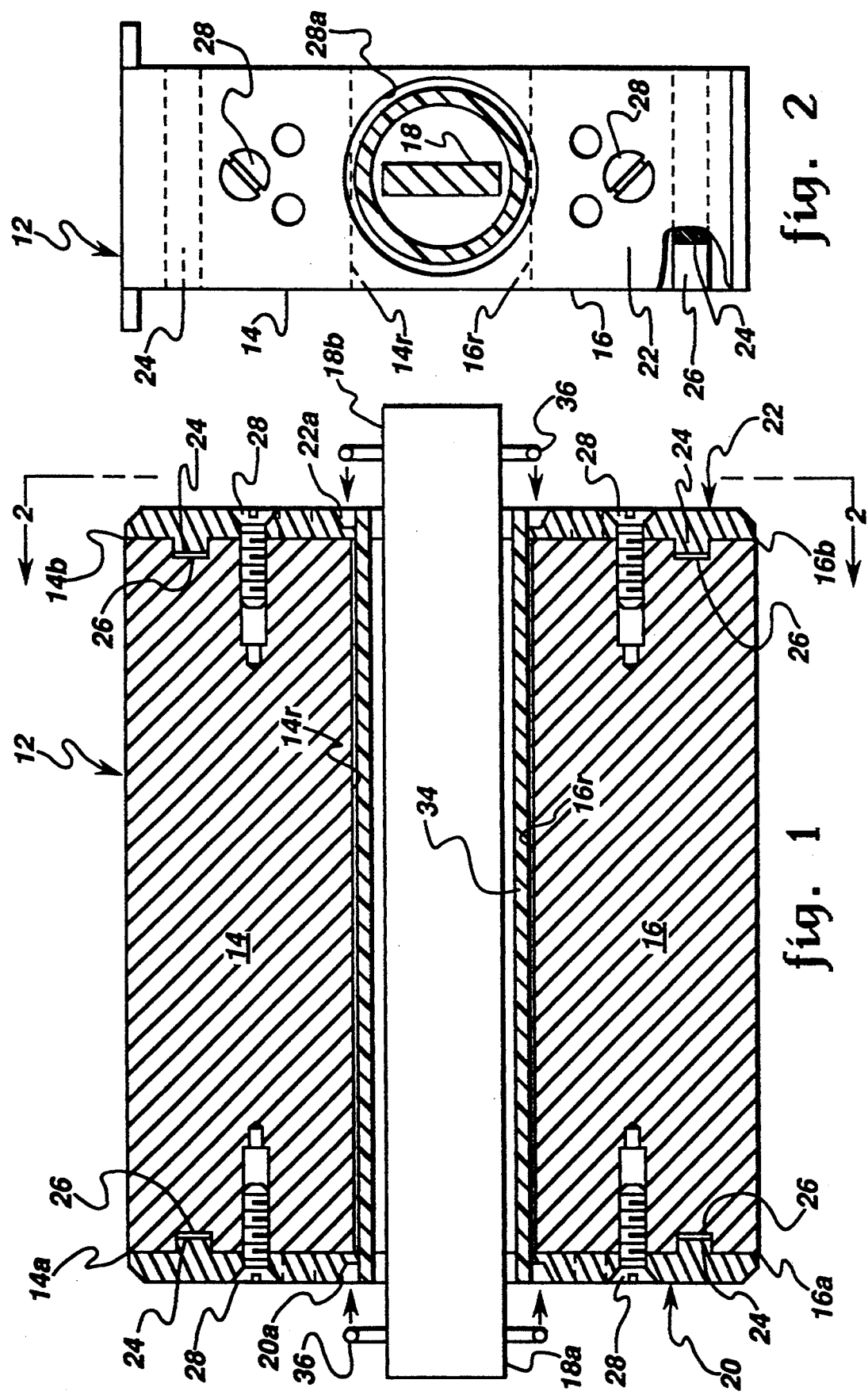

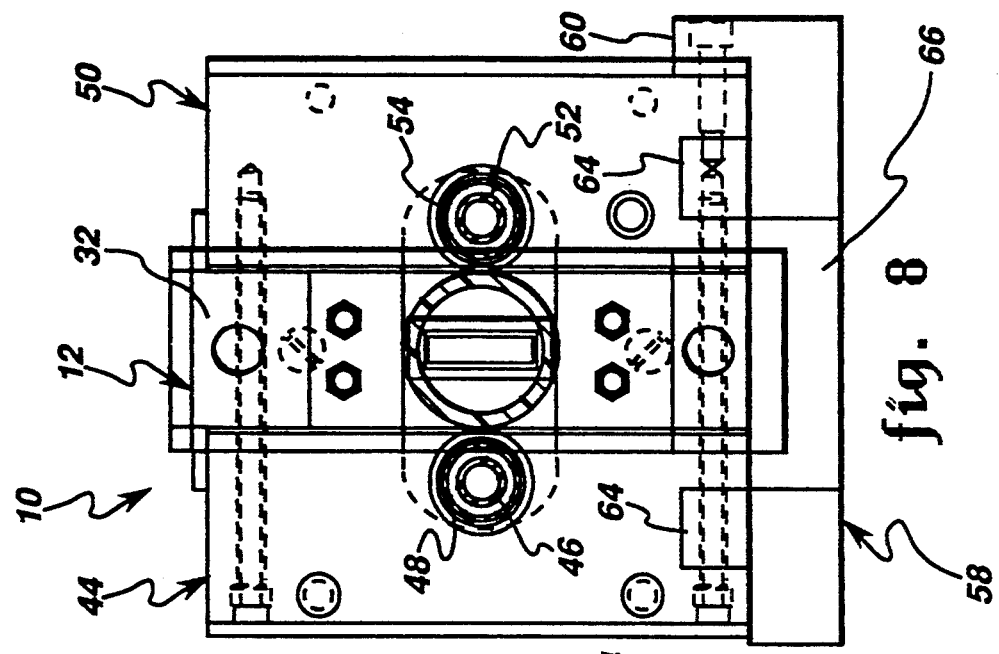
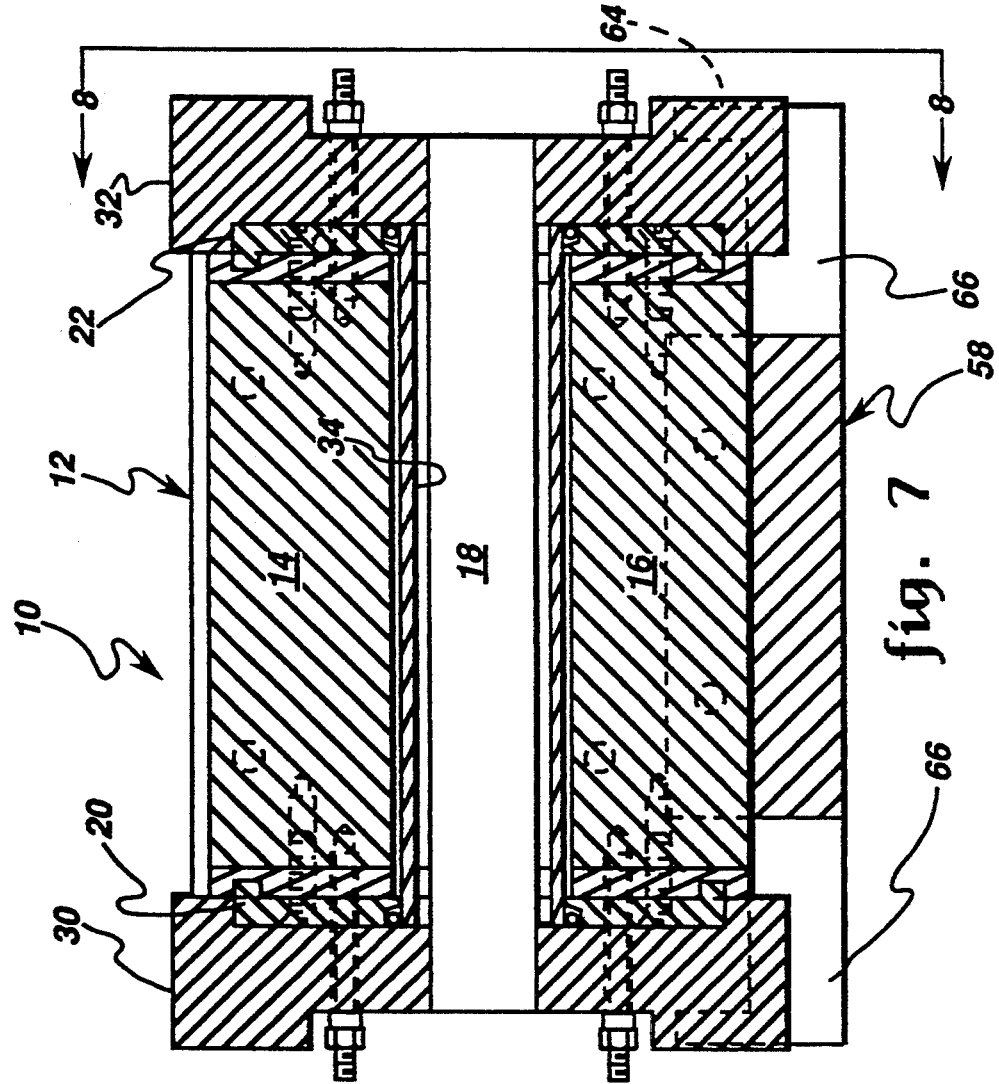

MODULAR SLAB ASSEMBLY FOR A FACE-PUMPED LASER

CROSS REFERENCE TO RELATED APPLICATION

The present invention is related to concurrently filed U.S. patent application Ser. No. 08/251,142, filed May 31, 1994, (Docket RD-22738) entitled "Diode Pumped Slab Module," assigned to the present assignee.

The present invention relates generally to face-pumped slab lasers, and, more specifically, to a modular construction thereof.

BACKGROUND OF THE INVENTION

Laser assemblies include several components which require precise alignment therebetween for effective operation thereof. When lasers are used in industrial applications, they must be periodically maintained which requires disassembly of selected components thereof, repair or replacement as required, and then reassembly of the components. The reassembly process requires precise alignment of the components for obtaining effective operation of the laser. Accordingly, the laser is unusable during the downtime required for its maintenance which has a negative financial affect.

Two exemplary commercial lasers include rod lasers and face-pumped slab lasers. The face-pumped slab lasers are relatively more complex and require cooling of the components thereof for effective operation and, therefore, the reconditioning thereof is a more complex and lengthy process than that associated with the simpler rod lasers.

In U.S. Pat. No. 5,278,860, assigned to the present assignee, a modular construction for a face-pumped laser head is disclosed which utilizes a fixturing jig assembly for constructing a modular face-pumped slab laser head. And, another positioning, compression, and storage device is utilized for temporarily holding together the slab head components. It is desirable to eliminate the jig assembly and the storage device for obtaining an improved modular face-pumped laser head assembly having less complexity and reduced down-time during maintenance.

SUMMARY OF THE INVENTION

A modular slab assembly for a face-pumped laser includes a slab module having top and bottom reflector segments, with first and second inner end caps joined thereto. A plurality of alignment keys are disposed between the inner end caps and the reflector segments for maintaining alignment therebetween, with the inner end caps being removably fastened to the reflector segments. The inner end caps have central apertures for supporting a slab tube, with a laser slab being disposed through the tube and supported at its ends by outer end caps removably fixedly joined to respective ones of the inner end caps. A pair of removable lamp modules are disposed on opposite sides of the slab module and contain lamps for exciting the laser slab.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 1 is an elevational, partly sectional view of a slab module in accordance with one embodiment of the present invention.

FIG. 2 is an elevational, end view of the slab module illustrated in FIG. 1 and taken along line 2—2.

FIG. 7 is an elevational, partly sectional view of the assembled lamp and slab modules of FIG. 5 on the positioning base.

FIG. 8 is an elevational, end view of the assembled lamp and slab modules on the positioning base of FIG. 7 taken along line 8—8.

DESCRIPTION OF THE PREFERRED EMBODIMENT (S)

Figures 3, 4:
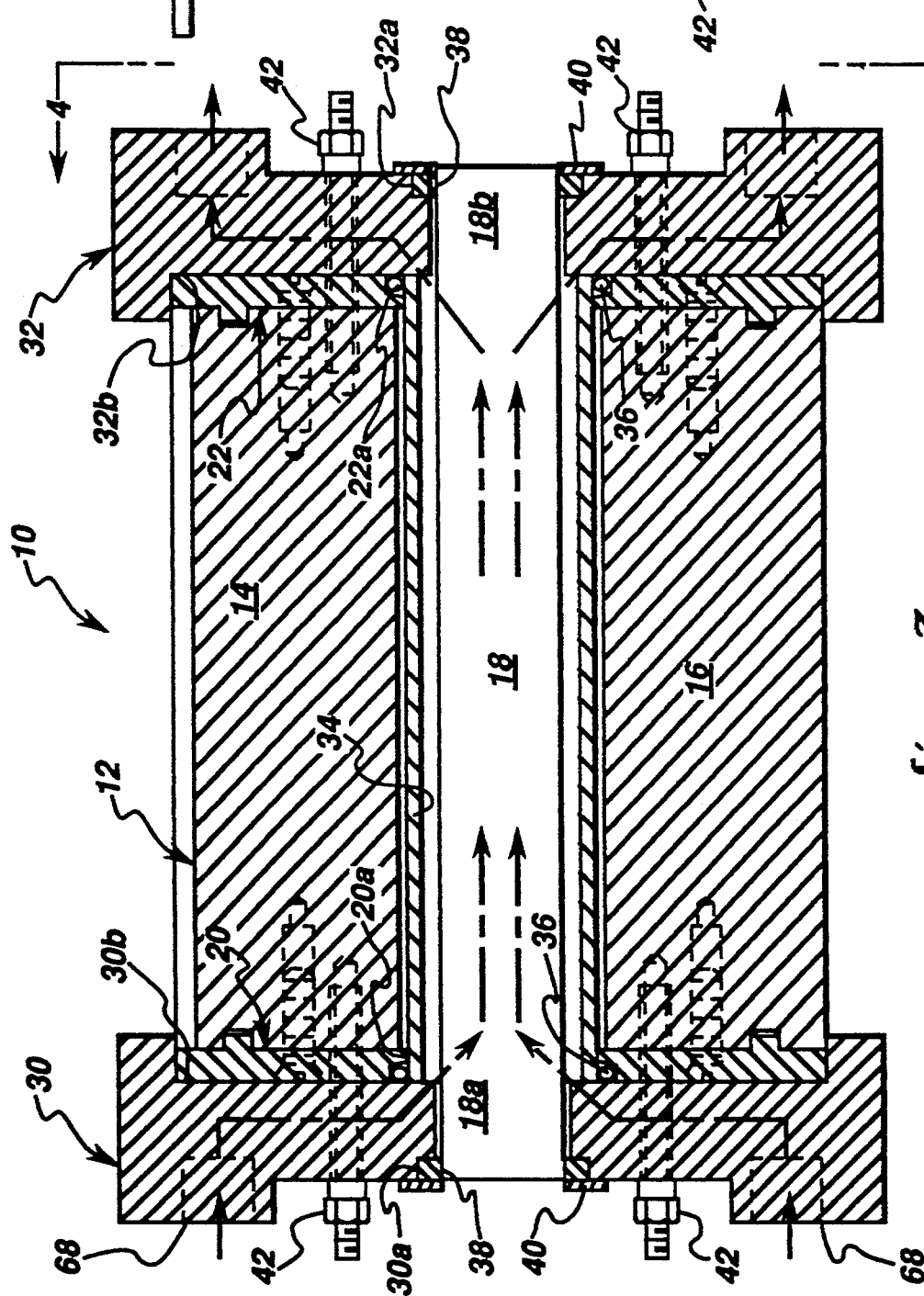
FIG. 3 is an elevational, partly sectional view of the slab module illustrated in FIG. 1 and further including outer end caps joined thereto.
FIG. 4 is an elevational, end view of the slab module illustrated in FIG. 3 and taken along line 4—4.

Illustrated in FIGS. 1–4 is a modular slab assembly or head 10 for a face-pumped laser which includes a self-supporting slab module 12 which forms a rigid skeleton or inner frame which allows for the elimination of the above described jig assembly and storage device previously configured for face-pumped lasers.

Referring firstly to FIGS. 1 and 2, the slab module 12 itself includes a first or top reflector segment 14 having first and second opposite ends 14a, 14b and a first or top reflector surface 14r extending therebetween, which in the exemplary embodiment illustrated is a planar surface. Spaced below the top segment 14 is a second or bottom reflector segment 16 having first and second opposite ends 16a, 16b, and a bottom or second reflector surface 16r extending therebetween, which in this exemplary embodiment is also a planar surface. The top and bottom segments 14, 16 are preferably formed of aluminum and conventionally gold-plated so that the top and bottom reflector surfaces 14r, 16r may be spaced parallel from each other for receiving a conventional laser slab 18 therebetween and providing effective reflection of excitation or pumping light energy thereto as described below. The slab 18 may be any suitable solid state lasing material such as Nd:YAG.

A first inner end cap 20 is disposed in abutting contact with the first ends 14a, 16a of the top and bottom segments 14, 16, and includes a first central access aperture 20a for receiving a first end 18a of the slab 18. A second inner end cap 22 is disposed in abutting contact with the second ends 14b, 16b of the top and bottom segments 14, 16, and includes a second central access aperture 22a for receiving a second end 18b of the slab 18. The end caps 20, 22 are preferably gold-plated brass in the exemplary embodiment.

In accordance with a preferred embodiment of the present invention, a plurality of elongate alignment keys 24 are disposed between the first and second inner end caps 20, 22 and respective ones of the first and second ends 14a,b and 16a,b of the top and bottom segments 14, 16 for maintaining alignment therebetween. In the exemplary embodiment illustrated in FIGS. 1 and 2, the alignment keys 24 are preferably integral with their respective first and second inner end caps 20, 22 and project toward the top and bottom reflector segments 14, 16. The keys 24 are preferably straight and extend transversely or horizontally. The top and bottom reflector segments 14, 16 preferably include a plurality of recesses 26 which are complementary in configuration with respective ones of the keys 24, with each of the keys 24 being disposed in a respective one of the recesses 26 for restraining rotational movement therebetween. In the exemplary embodiment illustrated, the keys 24 and recesses 26 are rectangular in cross section and have a suitably tight clearance therebetween so that when the end caps 20, 22 are assembled to the segments 14, 16 the keys 24 are inserted in the recesses 26 and therefore prevent rotational and vertical movement between the end caps 20, 22 and the segments 14, 16.

Suitable means for removably fastening the first and second inner end caps 20, 22 to the top and bottom reflector segments 14, 16 are provided in the exemplary form of machine screws 28. The screws 28 are suitably recessed in the end caps 20, 22 and threaded into the top and bottom segments 14, 16 for rigidly securing the end caps 20, 22 thereto. Accordingly, the screws 28 securely lock together the end caps 20, 22 to the top and bottom segments 14, 16, with the keys 24 being disposed in the recesses 26. The keys 24 in the recesses 26 provide an efficient means for self-aligning the first and second apertures 20a, 22a between the reflector surfaces 14r, 16r, as well as providing for rigidity of the assembled slab module 12. The slab module 12 therefore provides a rigid, self-supporting inner frame through which the slab 18 may be accurately positioned.

More specifically, FIGS. 3 and 4 illustrate first and second outer end caps 30, 32 removably fixedly joined to the first and second inner end caps 20, 22, respectively for supporting the slab 18 at its opposite ends 18a,b. A conventional glass slab tube 34 is firstly disposed in and extends from the first access aperture 20a to the second access aperture 22a, and the laser slab 18 is disposed coaxially within the tube 34 and supported by the outer end caps 30, 32.

The first outer end cap 30 includes a first central support aperture 30a coaxially aligned with the first access aperture 20a for supporting the slab first end 18a. The second outer end cap 32 includes a second central support aperture 32a coaxially aligned with the second access aperture 22a for supporting the slab second end 18b. A pair of conventional O-ring seals 36 as shown in FIGS. 1 and 3 are disposed at opposite ends of the slab tube 34 in abutting contact with the first and second outer end caps 30, 32 for sealing the slab tube ends to the first and second outer end caps 30, 32 in a conventional manner. The slab 18 extends through the slab tube 34, and a pair of rectangular O-ring supporting seals 38 as shown in FIGS. 3 and 4 are disposed at the opposite ends of the slab 18 for sealingly supporting the slab ends 18a,b in the first and second support apertures 30a, 32a of the first and second outer end caps 30, 32. Conventional retainers 40 retain the supporting seals 38 in the end caps 30, 32.

As illustrated in FIGS. 3 and 4, the first and second outer end caps 30, 32 are removably fixedly joined to the respective first and second inner end caps 20, 22 by a plurality of conventional double-ended stud bolts 42. The stud bolts 42 extend through respective apertures in the outer end caps 30, 32 and are suitably threadingly engaged into the top and bottom reflector segments 14, 16 for fixedly joining the outer end caps 30, 32 to the inner end caps 20, 22 and in turn to the top and bottom reflector segments 14, 16. The outer threads of the stud bolts 42 may be conventionally used for supporting additional components of the modular slab assembly 10 which are not the subject of the present invention. In order to provide accurate vertical self-alignment of the outer end caps 30, 32 with the inner end caps 20, 22, the first outer end cap 30 includes a generally U-shaped recess 30b on one side thereof which is complementary in configuration with the mating side of the first inner end cap 20 for receiving therein the first inner end cap 20 for coaxially aligning the first access and support apertures 20a and 30a. Similarly, the second outer end cap 32 includes a generally U-shaped recess 32b on one side thereof which is complementary in configuration with the mating side of the second inner end cap 22 for receiving therein the second inner end cap 22 for coaxially aligning the second access and support apertures 22a and 32a. In this way, both inner end caps 20, 22 are nested in their respective outer end cap 30, 32 to provide accurate alignment therebetween for maintaining a uniform spacing between the laser slab 18 and the inside surface of the slab tube 34 for channeling a cooling fluid such as water therebetween for obtaining uniform cooling. The recesses 30b, 32b preferably receive the respective inner end caps 20, 22 with relatively small tolerances therebetween so that when the stud bolts 42 are tightened into place, the outer end caps 30, 32 provide additional rigidity to the slab module 22.

Figure 5:
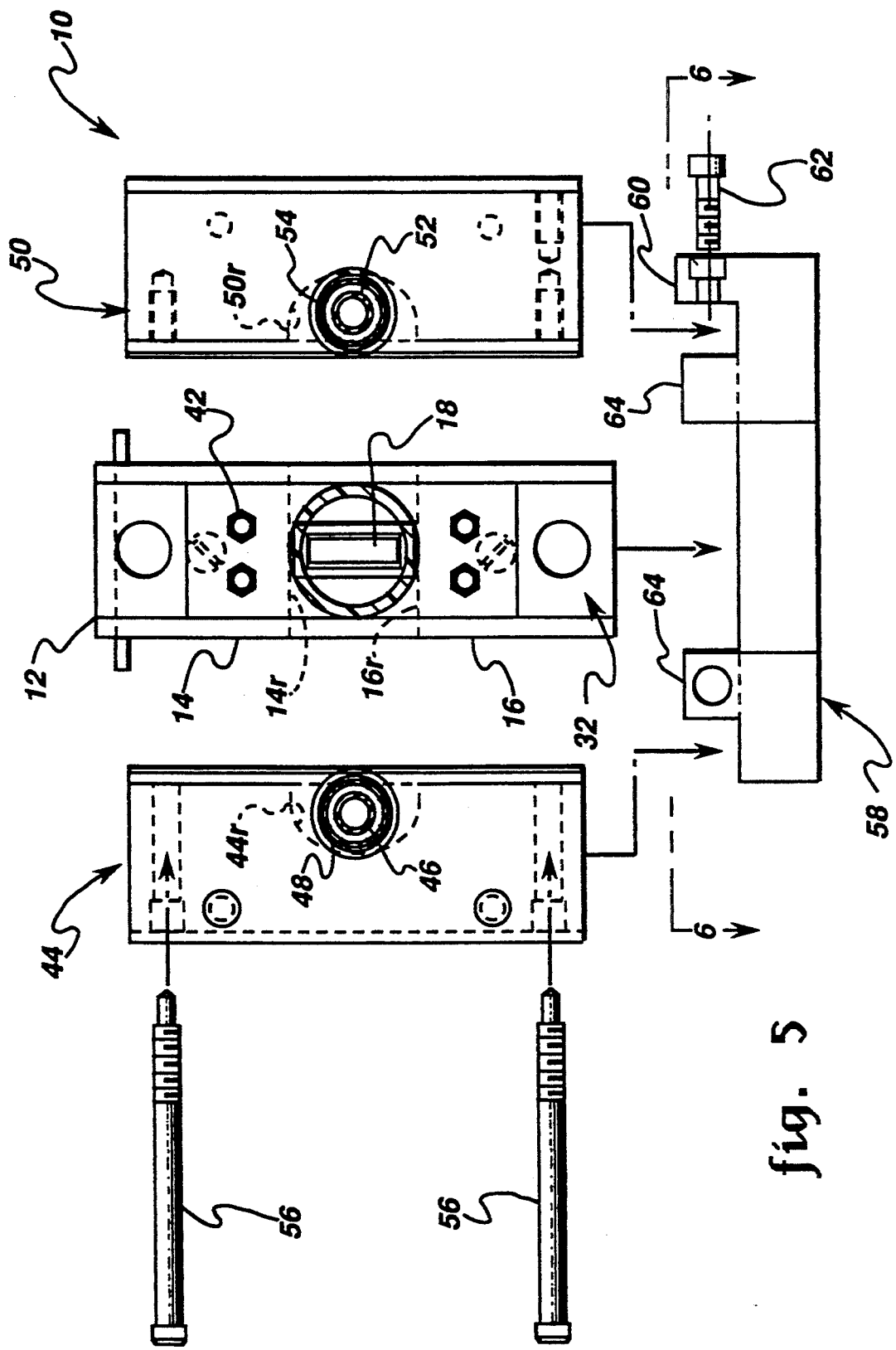
FIG. 5 is an elevational, exploded view of the slab module illustrated in FIG. 3 being joined to a base, along with a pair of lamp modules.

As illustrated in FIG. 5, the modular slab assembly 10 further includes a first or left lamp module 44 which has a left or third reflector surface 44r and a conventional left or first lamp 46 disposed adjacent thereto for conventionally exciting the slab 18. The left lamp module 44 may be conventionally formed of gold-plated aluminum, with the left reflector surface 44r being gold-plated and arcuate in cross section and facing the slab 18. The first lamp 46 is conventionally supported in the lamp module 44 inside a conventional glass tube 48 for providing cooling by circulating a cooling fluid such as water therethrough. The left lamp module 44 is removably fixedly joined to one side of the slab module 12 vertically across the top and bottom reflector segments 14, 16 for aligning contiguously the left reflector surface 44r with the top and bottom reflector surfaces 14r, 16r.

A second or right lamp module 50 is removably fixedly joined to an opposite side of the slab module 12 as shown in FIG. 5 and includes a right or fourth reflector surface 50r and a conventional right or second lamp 52 disposed adjacent thereto for conventionally exciting the slab 18. The second lamp 52 is suitably disposed in the right lamp module 50 within a conventional glass tube 54 for providing a cooling passage for channeling a cooling fluid such as water therethrough as is conventionally known. The right lamp module 50 is generally a mirror image of the left lamp module 44 and is also preferably made from gold-plated aluminum, with the fourth reflector surface 50r being gold-plated and arcuate in transverse section and facing the slab 18. The right lamp module 50 extends vertically across the top and bottom reflector segments 14, 16 for aligning contiguously the right reflector surface 50r with the top and bottom reflector surfaces 14r and 16r so that the resulting reflector formed by the first, second, third, and fourth reflector surfaces 14r, 16r, 48r, and 50r has a generally race-track shape configuration, with the first and second lamps 46, 52 being disposed on opposite side surfaces of the slab 18 in a conventional reflector configuration. The left and right lamps 46 and 52 are preferably of the arc-lamp or flash-lamp type suitable for pumping the laser slab 18.

Both left and right lamp modules 44, 50 are removably fixedly joined to the slab module 12 therebetween by a plurality of conventional bolts 56, which in the exemplary embodiment illustrated in FIG. 5 extend through the left module 44 and the slab module 12 and are threadingly engaged to the right module 50 in a sandwich type configuration. In this way, the left and right modules 44, 50 may be removed during a maintenance outage for repair or replacement thereof, or for allowing inspection of the slab module 12 itself.

Figure 6:
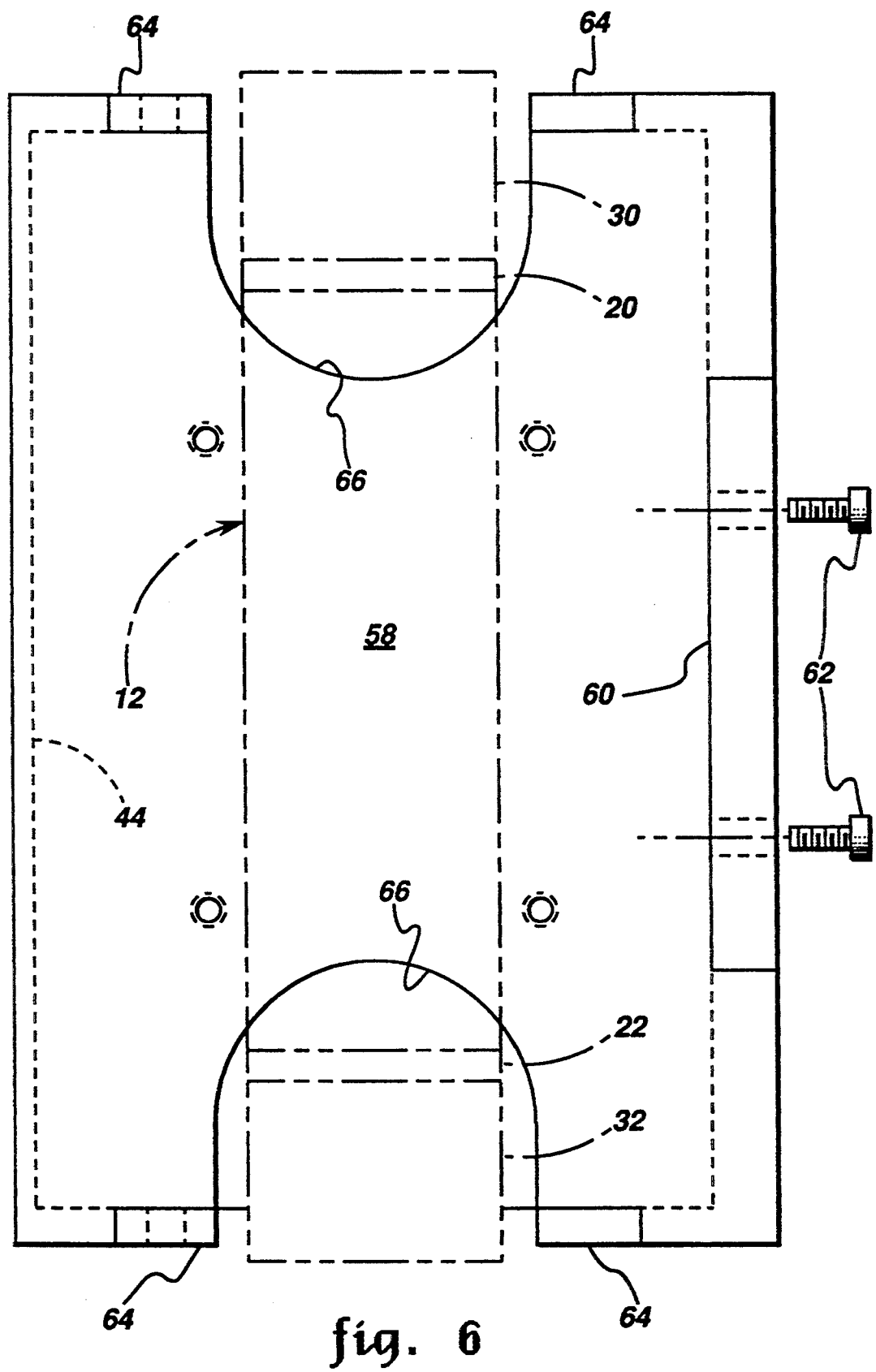
FIG. 6 is a top or plan view of the positioning base illustrated in FIG. 5 and taken along line 6—6.

In order to improve ease of disassembly while maintaining self-aligning capability, the modular slab assembly 10 preferably also includes a positioning base 58 as illustrated in FIGS. 5 and 6 to which the slab module 12, the left lamp module 44, and the right lamp module 50 are preferably removably fixedly joined. The base 58 includes an integral alignment flange 60 extending at least in part along one side thereof against which the right lamp module 50 is disposed in abutting contact therewith for aligning the slab module 12, joined to the right lamp module 50, relative to the base 58. Shown in phantom outline in FIG. 6 are the relative positions of the left and right lamp modules 44, 50 and the slab module 12 with its inner end caps 20, 22 and outer end caps 30, 32.

The base 58 supports these three modules 12, 44, and 50 which are joined together by the bolts 56 (see FIG. 5), and a plurality of additional bolts 62 extend transversely through the alignment flange 60 and into complementary mating bores in the bottom of the right lamp module 50 for maintaining these components together. The base 58 preferably also includes a plurality of alignment tabs 64 as shown in FIGS. 5 and 6 on opposite sides of the base 58 which are disposed transversely to the alignment flange 60. The tabs 64 provide an effective alignment configuration for positioning the left and right lamp modules 44, 50 therebetween. Since the outer end caps 30, 32 as illustrated in FIG. 3 extend above and below the respective top and bottom reflector segments 14, 16, as described above, the positioning base 58 as illustrated in FIGS. 6–8 further includes a pair of generally U-shaped cut-outs 66 for allowing the bottom reflector segment 16 to rest upon the base 58 between the pair of cut-outs 66, with the bottom ends of the outer end caps 30, 32 extending into respective ones of the cut-outs 66.

FIGS. 7 and 8 illustrate the complete assembly of the left and right lamp modules 44, 50 and the slab module 12 on the positioning base 58. These components provide a preferred embodiment of the modular slab assembly 10 which allows for ready disassembly of the components during a maintenance outage, with reassembly of repaired or replaced components using the self-aligning features described above. When reassembled, the slab 18 and the slab tube 34 are accurately positioned between the respective inner and outer end caps 20, 30 and 22, 32 in the slab module 12, and secondarily accurately positioned on the base 58 by the alignment flange 60 and tabs 64. The positioning base 58 preferably also functions as an adaptor plate which is conventionally mounted to the carrier of an optical rail (not shown) for cooperation with the remainder of the laser system as is conventionally known. In this way, the base 58 provides an alignment reference with the remainder of the system, with the slab module 12 and lamp modules 44, 50 being aligned relative to the base 58. Accordingly, the individual modules 12, 44, and 50 may be dismantled and replaced readily easily and effectively self-aligned for reducing down-time.

As is conventionally known, a face-pumped laser typically includes independent cooling circuits for cooling respective components thereof. For example, a cooling fluid such as water is circulated through the tubes 48 and 54 illustrated in FIG. 8 for cooling the respective lamps 46, 52 in a conventional known manner. And, in another cooling circuit illustrated schematically in phantom in FIGS. 3 and 4, suitable conventional ports 68 are provided in the respective outer end caps 30, 32 for suitably channeling the cooling fluid therethrough and inside the slab tube 34, with the seals 36 being compressed by the respective outer end caps 30, 32 for effectively sealing the ends of the slab tube 34 in a conventionally known manner.

The present invention provides substantial improvements over the modular laser head construction disclosed in the above referenced patent while still retaining many of the basic components and structure thereof. However, the modular construction of the slab module 12 itself eliminates the need for both the assembly jig and the positioning, compression, and storage device required in the above identified patent. The inner end caps 20, 22 interlock with the top and bottom reflector segments 14 and 16 as described above with respect to FIG. 3 for example, to provide the basic inner frame to which the outer end caps 30, 32 may be fixedly secured. The slab module 12 therefore provides self-aligning of the four central apertures 20a, 22a, 30a, and 32a for accurately supporting the slab 18 inside the slab tube 34. Since the outer end caps 30, 32 are directly bolted against the inner end caps 20, 22, the respective seals 36 are uniformly compressed around the opposite ends of the slab tube 34 for providing effective seals thereat. The modular construction of the slab module 12 and the mating left and right lamp modules 44, 50 are relatively simple, compact, and lightweight, with the lamp modules 44, 50 being readily removed from the slab module 12 for providing inspection. Furthermore, since the individual top and bottom reflector segments 14, 16 are relatively simple in configuration they may be manufactured using conventional extrusion manufacturing processes which is less expensive than conventional wire Electro-Discharge Machining (EDM).

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A modular slab assembly for a face-pump laser comprising a slab module including:
   a top reflector segment having first and second opposite ends and a top reflector surface extending therebetween;
   a bottom reflector segment having first and second opposite ends and a bottom reflector surface extending therebetween, said top reflector surface being spaced parallel from said bottom reflector surface for receiving a laser slab therebetween;

a first inner end cap disposed in abutting contact with said first ends of said top and bottom reflector segments and having a first central access aperture for receiving a first end of said slab;

a second inner end cap disposed in abutting contact with said second ends of said top and bottom reflector segments and having a second central access aperture for receiving a second end of said slab;

a plurality of alignment keys disposed between said first and second inner end caps and respective ones of said first and second ends of said top and bottom reflector segments for maintaining alignment therebetween; and means for removably fastening said first and second inner end caps to said top and bottom reflector segments for effecting a rigid assembly thereof.

2. An assembly according to claim 1 wherein said slab module further comprises:

a first outer end cap removably fixedly joined to said first inner end cap and having a first central support aperture coaxially aligned with said first access aperture for supporting said slab first end; and a second outer end cap removably fixedly joined to said second inner end cap and having a second central support aperture coaxially aligned with said second access aperture for supporting said slab second end.

3. An assembly according to claim 2 wherein:

said first outer end cap includes a recess being complementary in configuration with said first inner end cap for receiving therein said first inner end cap for coaxially aligning said first access and support apertures; and said second outer end cap includes a recess being complementary in configuration with said second inner end cap for receiving therein said second inner end cap for coaxially aligning said second access and support apertures.

4. An assembly according to claim 2 further comprising:

a left lamp module including a left reflector surface and a left lamp disposed adjacent thereto for exciting said slab, said left lamp module being removably fixedly Joined to one side of said slab module across said top and bottom reflector segments for aligning contiguously said left reflector surface with said top and bottom reflector surfaces; and a right lamp module including a right reflector surface and a right lamp disposed adjacent thereto for exciting said slab, said right lamp module being removably fixedly joined to an opposite side of said slab module across said top and bottom reflector segments for aligning contiguously said right reflector surface with said top and bottom reflector surfaces.

5. An assembly according to claim 4 further comprising:

a positioning base, with said slab module, said left lamp module, and said right lamp module being removably fixedly joined thereto.

6. An assembly according to claim 5 wherein said positioning base includes an alignment flange extending along one side thereof, and said right lamp module is disposed in abutting contact therewith for aligning said slab module, joined to said right lamp module, relative to said base.

7. An assembly according to claim 6 wherein said positioning base further includes a pair of generally U-shaped cut outs for allowing said bottom reflector segment to rest upon said base between said cut outs, with bottom ends of said first and second outer end caps extending into respective ones of said cut outs.

8. An assembly according to claim 6 wherein:

said alignment keys are integral with respective ones of said first and second inner end caps and project toward said top and bottom reflector segments; and said top and bottom reflector segments include a plurality of recesses being complementary in configuration with respective ones of said keys, with each of said keys being disposed in a respective one of said recesses for restraining rotational movement therebetween.

9. An assembly according to claim 8 further comprising:

a slab tube disposed in and extending from said first access aperture to said second access aperture; and said laser slab being disposed coaxially within said slab tube and extending from said first support aperture to said second support aperture.

10. An assembly according to claim 9 further comprising:

a pair of O-ring seals disposed at opposite ends of said slab tube in abutting contact with said first and second outer end caps for sealing said slab tube ends to said first and second outer end caps; and a pair of rectangular supporting seals disposed at opposite ends of said slab for sealingly supporting said slab ends in said first and second support apertures of said first and second outer end caps.

* * * * *